United States Patent
Everett et al.

(10) Patent No.: US 8,204,777 B2
(45) Date of Patent: Jun. 19, 2012

(54) METHODS AND APPARATUS FOR MANAGEMENT AND ANALYSIS OF COSTS AND SAVINGS

(75) Inventors: Matthew W. Everett, Basking Ridge, NJ (US); Supriya Mandava, Bedminster, NJ (US)

(73) Assignee: Alcatel Lucent, Paris (FR)

( * ) Notice: Subject to any disclaimer, the term of this patent is extended or adjusted under 35 U.S.C. 154(b) by 1493 days.

(21) Appl. No.: 11/128,640

(22) Filed: May 13, 2005

(65) Prior Publication Data
US 2006/0259310 A1 Nov. 16, 2006

(51) Int. Cl.
*G06Q 10/00* (2012.01)
*G06Q 30/00* (2012.01)
*G06F 17/00* (2006.01)
*G06G 7/00* (2006.01)

(52) U.S. Cl. ........................ 705/7.35; 705/400
(58) Field of Classification Search .................. 705/10, 705/7.35, 400
See application file for complete search history.

(56) References Cited

U.S. PATENT DOCUMENTS

| 5,970,476 | A  | * | 10/1999 | Fahey      | 705/28 |
|-----------|----|---|---------|------------|--------|
| 2002/0143677 | A1 | * | 10/2002 | Prakash    | 705/35 |
| 2003/0158784 | A1 | * | 8/2003  | Shaver et al. | 705/26 |

OTHER PUBLICATIONS

"Utility Company Saves Money and Time" IIE Solutions v28n6 p. 51. Jun. 1996.*

* cited by examiner

*Primary Examiner* — John Hayes
*Assistant Examiner* — Allen J Jung
(74) *Attorney, Agent, or Firm* — The Law Offices of Peter H. Priest

(57) ABSTRACT

Systems and techniques for management and analysis of cost and savings information. Products sold by an enterprise, and the components used in the creation of those products are identified. Transaction data relating to purchases of components by the enterprise is gathered from various sources and used to generate cost information for the components. The cost information is compared to baseline cost information to compute savings information for the components. Specifications of components used in products, information relating to the number of products created and sold and information categorizing components and products is used to generate cost and savings information for components, products and categories of products.

16 Claims, 2 Drawing Sheets

METHODS AND APPARATUS FOR MANAGEMENT AND ANALYSIS OF COSTS AND SAVINGS

FIELD OF THE INVENTION

The present invention relates generally to improved systems and techniques for managing and tracking costs of products and components. More particularly, the invention relates to systems and techniques for collecting cost and savings information for each of a plurality of purchased items and for making the cost and savings information available from different perspectives.

BACKGROUND OF THE INVENTION

One of the most important factors in the profitability of an enterprise is the cost of the goods and services that it purchases in order to manufacture products, provide services or perform other functions in order to earn revenue. Any savings that can be achieved for an item, especially an item that is purchased in large quantities, leads to an improvement in the profit margins the enterprise is able to realize for the goods and services that it sells.

In order to understand the costs of and potential savings associated with purchases, it is useful for persons within an enterprise to have access to as much information about these costs and savings as possible. However, a large enterprise may make very large numbers of purchases, so that it is difficult to understand the significance of much of the information unless it is presented in a comprehensible way. Many individual items may have a relatively low cost, yet have a large cumulative effect because many units of the items are purchased. In addition, an item or category of items may be used in numerous different products, so that cost savings realized in purchases of the item can affect a category of products. Further, cost savings achieved for one product or a category of products may result from savings from a number of items and it would be useful to be able to evaluate an item such as a component, product, category of products, or other category of items, to determine what costs and savings have been realized and the source of those costs and savings and to determine the impact of costs and savings for one item or category of items on other items or categories of items.

SUMMARY OF THE INVENTION

Among its several aspects, the present invention recognizes that there exists a need for systems and techniques for collecting and analyzing cost information for each item of interest purchased by an enterprise and evaluating the cost information to determine the effects of costs and savings from numerous possible perspectives.

In one exemplary embodiment, a system according to the present invention includes a transaction tracking server for receiving transaction data relating to the purchase of components by an enterprise. The components for which information is received are typically those intended for use in or incorporation into products to be sold by the enterprise. The server receives information relating to purchases, negotiations and other activities relating to acquisition of components. The information is assembled into a database storing information relating to purchases of each component and may include the date of each transaction, the quantity purchased in each transaction, any special features associated with a transaction, such as quantity discounts or special pricing.

The system may further suitably comprise a cost analysis server for receiving and assembling information relating to products to be offered for sale by the enterprise and using the component cost information to develop cost and savings information relating to the products. The cost analysis server hosts a product specification database for each product. The product specification database includes a product specification for each product defining the components making up each product. The cost analysis server also includes a baseline cost database storing a baseline cost for each component. The cost analysis server also hosts a cost analysis module for processing component and product information and baseline cost and transaction information in order to develop cost and savings information for each component and product. The cost analysis module identifies the components and generates cost and savings information for each component. When required, the cost analysis module identifies the components comprising a product and generates cost and savings information for the product.

Each item, such as a product or component, is associated with various categories into which it may be classified, such as product lines, areas of technology, regional markets and the like. The cost analysis module is capable of tracing an item through the various categories into which it may be classified so as to show the effect of the item on each category. The cost analysis module is further capable of associating related items or categories and providing cost and savings information from various perspectives.

A more complete understanding of the present invention, as well as further features and advantages, will be apparent from the following Detailed Description and the accompanying drawings.

DETAILED DESCRIPTION

The present invention will be described more fully hereinafter with reference to the accompanying drawings, in which exemplary embodiments of the invention are shown. This invention may, however, be embodied in various forms and should not be construed as limited to the embodiments set forth herein.

Figure 1:
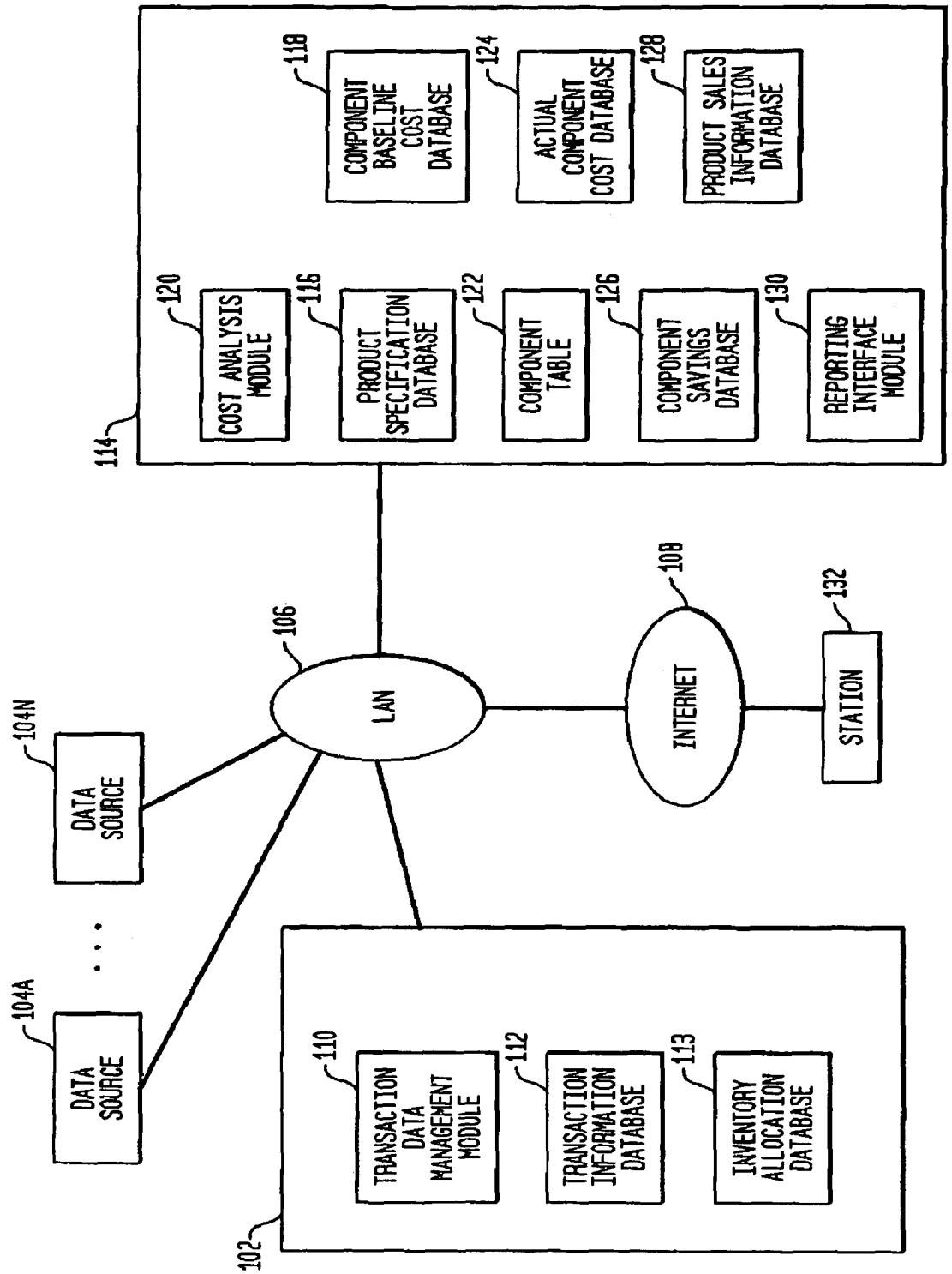
FIG. 1 illustrates a cost analysis system according to an aspect of the present invention.

FIG. 1 illustrates a system 100 for collecting and evaluating cost information according to an aspect of the present invention. The system 100 includes a transaction tracking server 102, which collects transaction information, including order, purchase and price negotiation information, from numerous different data sources 104A . . . 104N, throughout the enterprise. The data sources 104A . . . 1104N and the server 102 may communicate using any acceptable means but are illustrated here as communicating through a local area network 106. The local area network 106 also suitably provides a connection to the public Internet 108, in order to accommodate data sources in different locations.

Transaction information may be received by the server 102 from the various data sources 104A . . . 104N. As an example, the data source 104A may be a purchase management server operated by a supply management operation within the enterprise. The purchase management server manages transactions and may receive requests for quotations and purchase orders originating with various departments within the enterprise.

The purchase management server may administer price quotations, order acceptance and fulfillment information and other information received from vendors, and may provide interfaces to allow vendors to provide information. The server 104A also maintains price negotiation information and stores negotiation results, preferably storing a propose price and a negotiated price in association with a component for which the negotiation was conducted.

The server 104A receives descriptions of transactions involving the purchase of goods and services by the enterprise. One convenient format which a description may take is in the form of a bill of material. A bill of material typically provides information identifying each component purchased in a transaction, and the purchase price of the component. The bill of material may also suitably include identification of the product or product line for which the component is purchased, if this information is known. Additional information may include identification of the organizational unit making the purchase, the technological area into which the component is classified, and other information relevant to understanding the cost of the component and its implications for products produced and sold by the enterprise. It will be recognized that not every transaction will necessarily be characterized by a bill of material or other document or description providing comprehensive information, and that transaction information may be provided in any format or combination that will provide insight into the cost implications of the information. It will also be recognized that additional information may be received not associated with particular transactions. For example, a vendor may provide a comprehensive list of price quotations to be effective during a specified purchasing cycle, and these quotations may be subject to negotiation. The price quotations and negotiations are frequently relevant to expenditure and savings analysis, even if they are not associated with a particular transaction.

The transaction tracking server 102 includes a transaction data management module 110, which processes transaction information as it is received and stores it in a transaction information database 112. Information may be received through transmission initiated by the various data sources, through periodic polling or inquiries to the data sources, or through any number of other means. Information for each transaction is stored with all relevant available information about the transaction. Information may include, for example, the type and number of components purchased in a transaction, the organizational unit making the purchase, the product for which the component is purchased, the regional market to be served by products incorporating the component, and any other relevant information. It will be recognized that specific components purchased in a particular transaction will not always be specifically intended for incorporation into a specific product, but instead purchases may be made to fill inventory needs, with components being drawn from inventory for incorporation into various products. Therefore, information relating to use of components taken from inventory may also be supplied by one or more of the data sources 104A . . . 104N and stored in an inventory allocation database 113.

The transaction allocation database provides information that can be used to provide insight into proper allocation of transactions and costs. Transactions and costs may be allocated to products, product lines, regional markets, organizational units and the like, according to information relating to the use of inventory and purchased components.

The system 100 further comprises a cost and savings analysis server 114. The server 114 hosts a product specification database 116, identifying each product and the components comprising each product. For purposes of clarity in description, a product is an item produced and sold by the enterprise by or for whom the system 100 is operated and a component is an item that the enterprise purchases from one of its vendors. A component has an associated price paid to the vendor, and this price represents a cost to the enterprise. A component may include what will be referred to here as subcomponents. A subcomponent is an item used by a vendor to assemble a larger product sold to the enterprise, and for which individual pricing information is made available by the vendor. For example, a product produced by the enterprise may be a data processing network including a print station, a file management station, a plurality of workstations and network interface elements. Once of the components of the product is a print station. The purchase of the print station by the enterprise represents a transaction and the price paid to the vendor for the print station is a cost to the enterprise. The price quoted by the vendor for the print station includes detailed information about the elements that go into the overall price for the print station. Elements for which this information is provided may be thought of as subcomponents with their own individualized cost information, so that a purchase of a print station may provide information about the overall price of the print station, and the purchase may also provide information about prices of individual elements, such as printers. If a product specification includes information for components which in turn include subcomponents, information for all the components and subcomponents of a product are stored in the product specification database 116. Components or subcomponents of a product may also include value added services purchased from outside vendors in creation of the product.

The product specification database 116 also includes identification of each product as being part of a product line and being associated with one or more areas of technology. The database 116 can be searched in many different ways and may be searched by component, product, product line, organizational unit, or any desired perspective for which cost and savings information may be desired.

The cost and savings analysis server 114 also includes a component baseline cost database 118. The component baseline cost database 118 stores a baseline cost for each component and subcomponent, against which actual cost information, such as price quotes, negotiated prices and other price information can be compared. Comparison of actual cost information against baseline cost information can be used to provide savings information. Savings information can be associated with each component or computed for each component, and analyzed to identify savings and savings opportunities that may have been achieved or may be available. The cost baseline information may be developed for each of a succession of time periods, for example, calendar quarters. The baseline information is suitably preserved for each time period so that it can be used to develop cost trends.

The server 114 hosts a cost analysis module 120, to receive order, negotiation and purchase data from the server 102, typically by retrieving appropriate data from the transaction information database 112. The cost analysis module 120 processes this information to generate cost information for each component and subcomponent. The cost analysis module 120 is able to examine the product specification database 116 in order to identify each unique component that is purchased by the enterprise and each subcomponent going into a component. The cost analysis module 120 may suitably build a component table 122. The component table 122 may identify each component and subcomponent, and may also include information associating each component with all the products in which it appears. Once the component table 122 has been constructed, the cost analysis module 120 develops cost information for each component. The cost analysis module 120 examines the transaction information database 112 for transaction information for a component, and processes the transaction information to define cost information for the component.

Each component may have several alternative cost values associated with it. For example, a component may have a standard cost, a quantity purchase cost reflecting reduced prices for a specified minimum number of units in a single purchase, and a special offer cost, reflecting special prices for purchases made during a special promotion by the vendor. The cost analysis module 120 stores component and associated component cost information in an actual component cost database 124. The database 124 may also associate cost information with products, product lines, areas of technology, or other units larger than components if the cost information is particularly related to the larger unit. For example, if a transaction was made for the purchase of a component for incorporation into a specific product, and a special price was received for the transaction, the product for which the component was purchased is suitably identified in connection with the special cost value, in order to identify the circumstances under which the special cost was received. If desired, the component cost database 124 may include information associating component costs with larger units in order to simplify analysis of costs associated with the larger units and to provide immediate linkages between component costs and costs of larger units incorporating the components. However, analysis of costs may be performed whenever desired, for any unit desired, by examining the product specification database in order to identify the components making up the product or category of products under examination and retrieving cost information for the components in order to develop overall cost information for the product or category of products.

The component table 122 and the component cost database 124 are presented here for purposes of illustration as discrete entities, but it will be recognized that the information maintained therein may be generated when needed through analysis of the product specification database 116 and the transaction database 112. Also, the component table 122 and the component cost database 124 are presented here as being assembled all at once, but it will be recognized that the table 122 and the database 124 may be assembled incrementally as information for particular components is available, and that the table 122 and the database 124 may be updated with new information at any time. Historical cost information may be preserved in order to allow for comparisons with past cost information and for performing trend analysis.

Once the component cost database 124 has been assembled, it can be used to generate cost and savings information. If desired, each unit of cost information may be compared against a corresponding unit of baseline cost information and a component savings database 126 may be assembled. Alternatively, savings information for a component cost value may be computed as needed.

To take a specific example, suppose that an enterprise is in the business of assembling and installing computer networks. Products assembled and sold by the enterprise include a print station, a file management and storage station and an administrator station. The various stations are associated with product specifications that appear as follows:

| Print Station | |
|---|---|
| Component | Number used |
| SharpPrint 12B color laser printer | 1 |
| SharpPrint 1695 monochrome laser printer | 1 |
| Grandserver Model 850 PC | 1 |
| Network Interface Card | 1 |
| 6 foot network cable | 1 |
| USB cable | 2 |

| File Management and Storage Station | |
|---|---|
| Component | Number used |
| Grandserver Model 850 PC | 2 |
| Network Server Operating System Software | 2 |
| Network Interface Card | 1 |
| 6 foot network cable | 2 |

| Administrator Station | |
|---|---|
| Component | Number used |
| Grandserver Model 850 PC | 1 |
| Grandserver Model 2210 Monitor | 1 |
| Network Administrator Operating System Software | 1 |
| Network Interface Card | 1 |
| 6 foot network cable | 1 |

These product specifications are stored in the product specification database. They are retrieved by the cost analysis module 120 and examined to generate a component table, which appears as follows:

| Component | Number used | Product |
|---|---|---|
| Grandserver Model 850 PC | 4 | Print Station, File Station, Admin Station |
| Grandserver Model 2210 Monitor | 1 | Print Station, File Station, Admin Station |
| SharpPrint 12B color laser printer | 1 | Print Station |
| SharpPrint 1695 monochrome laser printer | 1 | Print Station |
| Network Server Operating System Software | 1 | File Station |
| Network Administrator Operating System Software | 1 | Admin Station |
| Network Interface Card | 4 | Print Station, File Station, Admin Station |
| 6 foot network cable | 4 | Print Station, File Station, Admin Station |
| USB Cable | 2 | Print Station |

Each of the components is associated with a baseline component cost stored in the database 118. The portion or portions of the database associated with these components, with exemplary baseline cost data, would then appear as follows:

| Component | Products/Number used | Baseline cost per component |
|---|---|---|
| Grandserver Model 850 PC | Print-1/File-2/Admin-1 | $1500 |
| Grandserver Model 2210 Monitor | Admin-1 | $ 200 |
| SharpPrint 12B color laser printer | Print-1 | $ 350 |
| SharpPrint 1695 monochrome laser printer | Print-1 | $ 150 |
| Network Server Operating System Software | Print-1/File-2 | $ 400 |
| Network Administrator Operating System Software | Admin-1 | $ 400 |
| Network Interface Card | Print-1/File-2/Admin-1 | $  20 |
| 6 foot network cable | Print-1/File-2/Admin-1 | $  10 |
| USB Cable | Print-2 | $   8 |

After assembling the component table 118, the cost analysis module would then survey the transaction database 112 in order to determine cost information for each component, which would then be stored in the database 124. The portion of the database 124 associated with these components, with exemplary cost data, would thus appear as follows:

| Component | Product/Number used | Actual Cost |
|---|---|---|
| Grandserver Model 850 PC | Print-1/File-2/Admin-1 | $1200 |
| Grandserver Model 2210 Monitor | Admin-1 | $ 150 |
| SharpPrint 12B color laser printer | Print-1 | $ 325 |
| SharpPrint 1695 monochrome laser printer | Print-1 | $ 100 |
| Network Server Operating System Software | Print-1/File-2 | $ 350 |
| Network Administrator Operating System Software | Admin-1 | $ 350 |
| Network Interface Card | Print-1/File-2/Admin-1 | $  15 |
| 6 foot network cable | Print-1/File-2/Admin-1 | $  10 |
| USB Cable | Print-2 | $   8 |

Once component cost and savings information has been computed as desired, the information may be examined and processed in order to provide cost and savings information from any desired perspective. Cost information may be computed for components, products, product lines, organizational unit, regional market, or any other category desired.

In order to evaluate the impact of component cost information from a particular perspective, the perspective is defined. For example, the cost impact of print stations sold in a particular geographic region may be desired. The cost and savings analysis server 114 may either host or have access to information identifying and classifying products and providing the number of products in each classification. Classifications may include, for example, product lines. A product line may include various types of data processing stations. Products that are categorized as belonging to this product line may include print stations, file storage and management stations and administrative stations. The overall numbers of data processing stations sold or expected to be sold will be known, as will the numbers of each type of data processing station sold or expected to be sold. This sales information will suitably be broken down as desired, such as by region or sales channel.

The server 114 suitably hosts a product sales information database 128, which defines each classification of products and provides numbers of products falling into each classification. For example, a portion of the database might appear as follows:

| Product Line | Total Sales |
|---|---|
| Data Processing Station Product | 36 |
| Print Station | 14 |
| File Storage and Management Station | 12 |
| Administrator Station | 10 |

It will be recognized that this information may be obtained from other sources, and need not be continuously maintained by the server 114. Instead, the needed information may be obtained whenever there is a need to analyze cost information.

In order to provide an understanding of cost information, the cost analysis module 120 receives a definition of the type of analysis required. This definition may come from direct user inputs, for example, from a user station 132, or from predefined instructions. The cost analysis module then examines product sales information such as the information listed above in order to determine the scope of the examination required and the effects of the examination. For example, a desired analysis may be the analysis of cost and savings information for the monochrome printer used in the print station, the analysis of cost and savings information for the computer used in all data processing stations, or the total savings for print stations, measured against the baseline cost for the stations.

The cost analysis module 120 suitably examines the necessary information in order to determine the parameters of the analysis, consulting whatever databases are needed in order to obtain information to perform the analysis. For example, if analysis of a product or product line is required, the module 120 examines the product specification database to identify the components comprising the product, and then examines the component cost database 124 to obtain component cost information for each component. The module 120 then examines the component baseline cost database 118 and compares the actual cost for a component with the baseline cost, or alternatively simply consults the component savings database 126, to determine the saving attributable to each component. The module 120 then assembles the cost and savings for the product, examines the product sales information, such as the database 128 and determines the total cost and savings attributable to the product. The module 120 can further examine the product sales information to identify larger categories in which the product appears, and determine the effect of the product on those categories.

In order to determine the cost and savings attributable to a component, the module 120 consults the component cost database 124 to determine the cost of the product, and then determines savings by comparison against the baseline cost from the database 118 or by retrieving the savings for the component from the database 126. The module 120 then examines the component table 122 to identify all appearances of the component in products and then surveys sales information to determine the sales of products including the component. The module 120 then computes the overall effect of the component cost and savings from the perspective defined in the instructions. Numerous other analyses are possible, performed by examining the instructions defining the analysis and examining and processing appropriate data in a way similar to that described above.

The cost and savings analysis server 114 hosts a reporting interface module 130, used to provide reporting instructions for the cost analysis module, and to receive and present information from the module 120. Reports may be prepared according to instructions from a user working at a user station such as the station 132, or may be prepared according to predefined instructions. The module 130 passes the reporting instructions to the module 120, which performs the analysis defined by the instructions and delivers the data generated by the analysis to the reporting interface module. The reporting interface module then formats and presents the data, for example displaying it on a display using the station 132, or storing a report for later retrieval and display or printout. Suitably, the module 130 is capable of presenting the data in a format that allows a user to change the scope of the analysis. For example, the format may permit the user to follow a component through different products, or to change the scope of an investigation from a product, to a product line, to a region and so on. The flexibility of the present approach may allow users to make any other changes in the scale and nature of the examination that they may desire.

Figure 2:
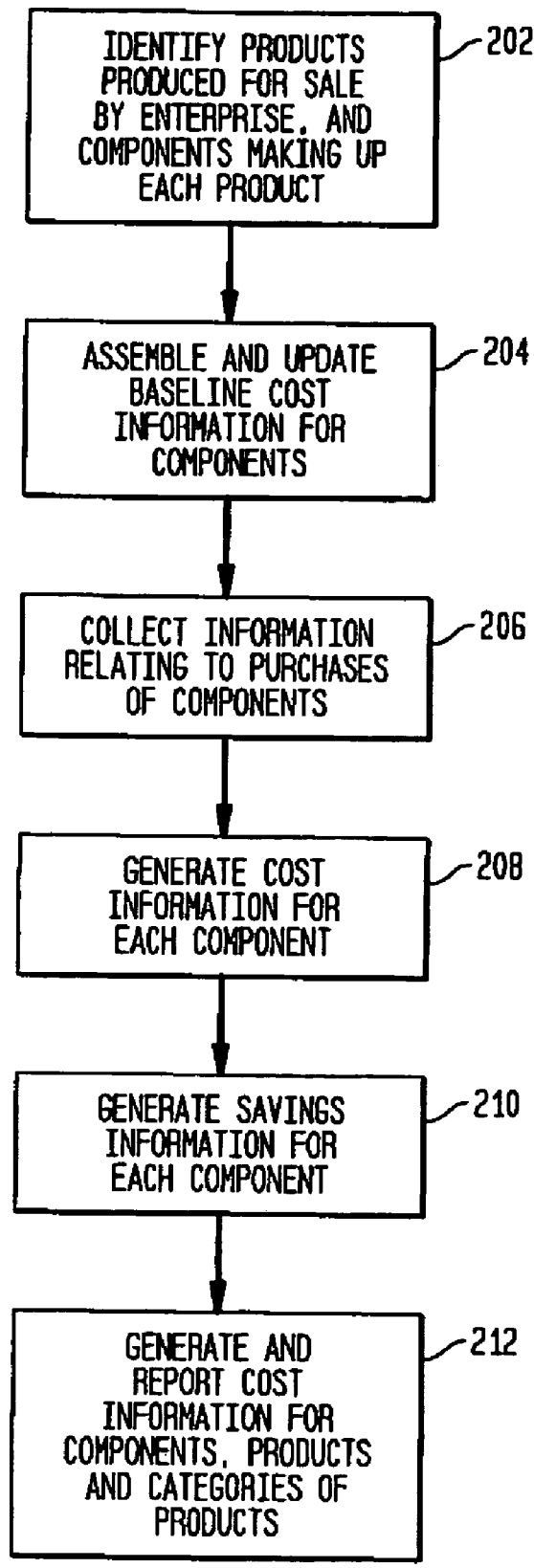
FIG. 2 illustrates a process of cost analysis according to an aspect of the present invention.

FIG. 2 illustrates the steps of a process 200 of cost and savings analysis according to an aspect of the present invention. At step 202, products sold by an enterprise are identified and the components making up each product are identified. The identification suitably includes classification of each product into all categories in which it may advantageously be considered, such as product lines, areas of technology, regional markets, and any other categories desired. At step 204, baseline cost information for each component is assembled and periodically updated. At step 206, transaction information relating to purchases of components is continuously collected. At step 208, cost information for each component is generated through analysis of the transaction information, and suitably stored for later retrieval. At step 210, savings information is generated by comparing cost information for each component with the corresponding baseline cost information for the component. The savings information is suitably stored for later retrieval. At step 212, cost and savings information for components, products and categories of products is generated and reported as desired. Reporting of cost information suitably provides mechanisms for examining cost information in related categories and identifying the effects of an item on the various categories into which it is classified.

While the present invention is disclosed in the context of several embodiments, it will be recognized that a wide variety of implementations may be employed by persons of ordinary skill in the art consistent with the above discussion and the claims which follow below.

We claim:

1. A system for management and analysis of costs and savings, comprising:
    a data collection server receiving and maintaining transaction information relating to purchase of components by an enterprise, the data collection server storing and updating the transaction information as it is received; and
    a cost analysis server receiving and maintaining product specification information to identify the number and quantity of components making up individual products sold by the enterprise and product information relating to sales and usage of products by the enterprise, the cost analysis server further receiving transaction information from the data collection server and analyzing the transaction information to generate component cost and savings information for the components, component savings information being based on cost reductions for components, the cost analysis server using the product information and the component cost and savings information to generate cost and savings information for products and categories of products incorporating or using the components, the cost analysis server tracing costs and savings for components across different products and categories of products, to accept definitions of categories for which cost and savings information is to be presented, and to present cost and savings information for the categories.

2. The system of claim 1, wherein the cost analysis server includes a cost analysis module operative to identify components making up a product and to obtain component cost information for the product, the cost analysis module being further operative to determine sales and usage information for the product, the cost analysis module being further operative to analyze the sales and usage information and the component cost information to determine overall product cost information associated with the product.

3. The system of claim 2, wherein the product sales and usage information includes information identifying categories to which each product belongs and wherein the cost analysis module is operative to examine the product sales and usage information and the product specification database in order to identify products and components falling into a category of interest.

4. The system of claim 3, wherein the cost analysis module is operative to generate product cost information for products identified as falling into a category of interest and to use the product cost information to generate cost information for the category.

5. The system of claim 4, wherein the cost analysis server includes a component baseline cost database and wherein the cost analysis module is operative to generate component savings information for a component by comparing the component cost information for the component with component baseline cost information for the component, and wherein the cost analysis module is operative to determine the effect of savings for a component by identifying all categories of interest into which the component falls and determining the effect of the savings for the component on cost information for the categories.

6. The system of claim 5, wherein the cost analysis module is operative to generate component savings information based on differences between proposed component prices and negotiated component prices.

7. The system of claim 1, wherein the generation of savings information for components includes taking into account alternative prices associated with one or more components.

8. The system of claim 7, wherein the taking into account of alternative prices associated with one or more components includes determining the applicability of one or more of the alternative prices based on conditions associated with the alternative prices.

9. A computer based method of management and analysis of costs and savings, comprising the steps of:
    receiving and maintaining transaction information relating to purchases of components by an enterprise;
    receiving and maintaining product specification information by a cost analysis server to be used in identifying by the cost analysis server the number and identity of components making up individual products sold by the enterprise;

receiving and maintaining product information by the cost analysis server relating to sales and usage of the products by the enterprise;

analyzing the transaction information by the cost analysis server to generate component cost and savings information for the components; and using the product information and the component cost and savings information by the cost analysis server to generate cost and savings information for products and categories of products incorporating or using the components, the cost and savings information being generated so as to trace cost and savings information through components, products and categories of products and to show effects of cost and savings information for one or more categories on other categories.

10. The method of claim 9, wherein generating cost information for a product includes obtaining and examining sales and usage information for the product and using the sales and usage information in order to determine the total number of units of the product produced, examining product specification information in order to determine the number and identity of components making up each unit of the product, and analyzing the sales and usage information and the product specification information to determine the overall component costs for the total number of units of the product.

11. The method of claim 10, wherein the product sales and usage information includes information identifying categories to which each product belongs and further including a step of examining product sales information and product specification information in order to identify products and components falling into a category of interest.

12. The method of claim 11, further including a step of generating product cost information for products identified as falling into a category of interest and using the product cost information to generate cost information for the category.

13. The method of claim 11, further including the steps of: generating component savings information for a component by comparing component cost information for the component with component baseline cost information for the component; and determining the effect of savings for a component by identifying all categories of interest into which the component falls and determining the effect of the savings for the component on cost information for each category.

14. The method of claim 13, wherein generating component savings information includes evaluating negotiated prices for components against proposed prices for the components.

15. The method of claim 9, wherein the generation of savings information for components includes taking into account alternative prices associated with one or more components.

16. The method of claim 15, wherein the taking into account of alternative prices associated with one or more components includes determining the applicability of one or more of the alternative prices based on conditions associated with the alternative prices.

* * * * *